United States Patent
Gomis et al.

(10) Patent No.: US 10,153,642 B2
(45) Date of Patent: Dec. 11, 2018

(54) MULTIPHASE GENERATOR-CONVERSION SYSTEMS

(71) Applicant: Alstom Renewable Technologies, Grenoble (FR)

(72) Inventors: Oriol Bellmunt Gomis, Barcelona (ES); Lose Luis Dominguez Garcia, Sitges (ES); Monica Penalba Aragues, Girona (ES)

(73) Assignee: GE RENEWABLE TECHNOLOGIES WIND B.V., Pa Breda (NL)

(*) Notice: Subject to any disclaimer, the term of this patent is extended or adjusted under 35 U.S.C. 154(b) by 361 days.

(21) Appl. No.: 15/104,133

(22) PCT Filed: Dec. 12, 2014

(86) PCT No.: PCT/EP2014/077518
§ 371 (c)(1),
(2) Date: Jun. 13, 2016

(87) PCT Pub. No.: WO2015/086801
PCT Pub. Date: Jun. 18, 2015

(65) Prior Publication Data
US 2016/0315476 A1    Oct. 27, 2016

(30) Foreign Application Priority Data
Dec. 13, 2013  (EP) .................................... 13382511

(51) Int. Cl.
*H02M 7/04* (2006.01)
*H02J 3/38* (2006.01)
(Continued)

(52) U.S. Cl.
CPC ............... *H02J 3/386* (2013.01); *H02M 5/04* (2013.01); *H02M 5/42* (2013.01); *H02M 7/04* (2013.01);
(Continued)

(58) Field of Classification Search
CPC ............ H02J 3/386; H02M 7/04; H02M 5/04; H02M 5/42; H02M 7/06; H02M 5/22; H02M 5/458; Y02E 10/763
See application file for complete search history.

(56) References Cited

U.S. PATENT DOCUMENTS 8,018,083 B2    9/2011  Larsen et al.
2011/0221195 A1 9/2011  Raju

FOREIGN PATENT DOCUMENTS

| EP | 2624430 A1 | 8/2013 |
| WO | 2010058028 A2 | 5/2010 |
| WO | 2013/135811 A2 | 9/2013 |

OTHER PUBLICATIONS

European Search Report and Written Opinion issued in connection with corresponding EP Application No. 13382511.7 dated May 30, 2014.
(Continued)

*Primary Examiner* — Robert L Deberadinis
(74) *Attorney, Agent, or Firm* — Douglas D. Zhang; GE Global Patent Operation

(57) ABSTRACT

Multiphase generator-conversion systems and clusters are disclosed. The multiphase generator-conversion systems include a multiphase n-stator generator, n conversion lines and a transformer module. Each n conversion line is coupled to the plurality of phase lines of one of the n stators, respectively. Each conversion line comprises a rectification module, coupled to the respective plurality of phase lines, configured to receive a multiphase AC voltage and generate a first DC voltage at an output. A dc/ac inverter is coupled to the output of the respective rectification module. The dc/ac inverter receives the first dc voltage and generates a single-phase AC voltage at an output. The transformer module is arranged to receive the n single-phases of the dc/ac inverters and generate an n-phase AC voltage at an
(Continued)

output. This voltage is input to a single diode rectifier. Multiphase generator-conversion clusters include multiphase generator-conversion systems arranged to be coupled to a diode rectifier.

17 Claims, 6 Drawing Sheets

(51) Int. Cl.
*H02M 5/04* (2006.01)
*H02M 5/42* (2006.01)
*H02M 7/06* (2006.01)
*H02M 5/22* (2006.01)
*H02M 5/458* (2006.01)

(52) U.S. Cl.
CPC ............ *H02M 7/06* (2013.01); *H02M 5/22* (2013.01); *H02M 5/458* (2013.01); *Y02E 10/763* (2013.01)

(56) References Cited

OTHER PUBLICATIONS

Office Action issued in connection with corresponding EP Application No. 13382511.7 dated Mar. 14, 2016.

Garces, A., et al., "Cluster Interconnection of Offshore Wind Farms Using Direct AC High Frequency Links," Department of Electric Power Engineering, dated Jan. 1, 2009, Retrieved from the Internet URL: http://www.elkraft.ntnu.no/eno/Papers2009/Bremen2009-Alejandro.pdf, on Feb. 27, 2017, pp. 1-8.

Mogstad, B.A., et al., "A power conversion system for offshore wind parks," 34th Annual Conference of IEEE, dated November 10, 2008, Retrieved from the Internet URL: https://www.researchgate.net/profile/Marta_Molinas/publication/224374264_A_power_conversion_system_for_offshore_wind_parks/links/00b4951de24e7a245f000000.pdf, on Feb. 27, 2017, pp. 2106-2112.

Second Office Action issued in connection with corresponding EP Application No. 13382511.7 dated Sep. 9, 2016.

PRIOR ART

MULTIPHASE GENERATOR-CONVERSION SYSTEMS

BACKGROUND

The present disclosure relates to energy generation and more specifically to multiphase generator-conversion systems.

Modern wind turbines are commonly used to supply electricity into the electrical grid. Although the electrical grid is typically an AC grid, some applications exist for which DC technologies may be used. That may be the case of offshore wind power plants, where DC wind turbine power plants may be used instead of AC wind turbine power plants if they have to be connected to a high-voltage, direct current (HVDC) link. DC wind turbine power plants are wind turbine power plants with an internal DC collection grid, instead of a conventional AC collection grid.

Typically, some wind turbines employ permanent magnet generators. One type of permanent magnet generators are multiphase AC generators with n i-phase stators (typically 3-phase stators). In order to implement DC wind power plants using conventional multiphase AC wind turbine generators, the output of the wind turbine's power conversion system must be in DC. Therefore, n×i-phase (typically 3-phase) permanent magnet generators of wind turbines need to be adjusted for their usage in a DC collection grid. Since the output voltage must be in DC and the permanent magnet generators are in AC, AC/DC converters are required to carry out the conversion. This conversion may imply a large number of power converters and the necessity of large power transformers. The large amount of components required is not desirable due to space and weight restrictions of wind turbines, even more so in offshore configurations where transportation, maintenance and servicing raises the overall cost of the installation.

The present disclosure relates to various methods and devices for avoiding or at least partly reducing this problem.

BRIEF DESCRIPTION OF THE INVENTION

In a first aspect, a multiphase generator-conversion system is disclosed. The multiphase generator conversion system includes a multiphase generator having one rotor and at least n number of multiphase stators. Each multiphase stator has a plurality of phase lines. Furthermore, the multiphase generator conversion system has n conversion lines. Each conversion line is coupled to the plurality of phase lines of one of the n multiphase stators, respectively. Each conversion line includes an ac/ac module, coupled to the respective plurality of phase lines and arranged to receive a multi-phase AC voltage and generate a single phase AC voltage at an output. The multiphase generator conversion system further includes a transformer module arranged to receive the n single-phases of the ac/ac modules and generate an n-phase AC voltage at an output.

By generating an n-phase AC voltage at the output it is possible to connect only a single rectification module for converting the n-phase AC voltage to a DC voltage. Thus, a large reduction of rectification modules may be achieved.

In some implementations the n multiphase stators may be in phase with each other. Therefore, each phase line of each stator may be in phase with a corresponding phase of the other stators. For example, in a 3-stator, and 3-phase/stator configuration, all stators may carry 3 phases 120° apart (e.g. at 0°, 120°, 240°). In other implementations, the n stators may be completely out of phase meaning that no single phase line may carry the same phase as another phase line of another stator. For example, in a 3-stator, and 3-phase/stator configuration, each stator may carry 3 phases 120° apart, but, e.g., the first stator may have 3 phases at 0°, 120°, 240°, the second stator at 40°, 160°, 280° and the third stator at 80°, 200°, 320°, thus giving place to a so-called 9-phase stator.

In some embodiments the transformer module may have n single-phase transformers. Each transformer may be coupled to one of the n outputs of the dc/ac inverters, respectively. The n output voltages of the n single phase transformers may comprise the n-phase AC voltage. To achieve this, the ac/ac converters need to be synchronized, e.g. with a clock, so that the medium frequency signals entering the respective transformers are phase shifted. Therefore, the rectification module will perceive the single phase outputs of the n transformers as a "single" AC multiphase signal.

In some embodiments the transformer module may include a single n-phase transformer, arranged to receive the n outputs of the dc/ac inverters at n inputs, respectively, and generate the n-phase AC voltage at an output. This solution minimizes also the number of transformers, as the transformer module has only a single transformer.

In some embodiments n is equal to 3. Therefore, there may be 3 conversion lines and the transformer module shall be a 3-phase transformer module.

In some embodiments the transformer module may include low voltage/medium voltage, medium frequency/high frequency (MF/HF) transformers. Such transformers may allow to increase the voltage level output of the generator and to reduce weight and size of the transformer due to the frequency of operation as the size of the transformers is inversely proportional to the operating frequency. The term "low voltage" is used to denote voltage values in the order of one kilovolt (1 kV). For example, 690V, 900V or 3.3 kV are example low voltage values used in transformer modules according to embodiments herein. The term "medium voltage" is used to denote voltage values in the order of tens of kilovolts. For example, 33 kV or 66 kV are example medium voltage values used in transformer modules according to embodiments herein. Finally, the term "medium frequency/high frequency" is used to indicate transformers operating within the 1-20 kHz frequency range.

In some embodiments the ac/ac module may be a matrix converter. In other embodiments the ac/ac module may include a first rectification module coupled to a dc/ac inverter. The first rectification module may be coupled to the respective plurality of phase lines and be arranged to receive a multi-phase AC voltage and generate a first DC voltage at an output. The dc/ac inverter may be coupled to the output of the respective first rectification module. The dc/ac inverter may receive the first dc voltage and generate a single phase AC voltage at an output. A matrix converter may allow passing directly from a multiphase ac signal to a single phase ac signal without first converting to dc. This embodiment may have less noise and harmonics being added to the conversion line. The embodiments with ac/dc conversion by the first rectification module and subsequent dc/ac conversion by the dc/ac inverter provide a more standard and lower cost solution.

In some embodiments, the multiphase generator conversion system may further include a second rectification module, such as a diode rectifier, arranged to receive the n-phase AC voltage at an input and generate a DC voltage at an output.

In another aspect, a wind turbine is disclosed. The wind turbine may include a multiphase generator conversion system according to previous aspects herein.

In yet another aspect, a multiphase generator conversion cluster is disclosed. The cluster may have one or more multiphase generator conversion systems according to previous aspects herein. Each multiphase generator conversion system may generate an n-phase MF/HF AC voltage at an output. The cluster may further include a second rectification module, such as a diode rectifier, arranged to receive the one or more n-phase AC voltages at an input and generate a DC voltage at an output. Implementations according to this embodiment may be beneficial by further minimizing the use of rectification modules as they require only one rectification module per cluster.

The number of generator-conversion systems that may be coupled to one rectification module may only be limited by the physical distance between each generator-conversion system and the rectification module.

In yet another aspect, a wind turbine cluster is disclosed. The wind turbine cluster may have a plurality of wind turbines. Each wind turbine may have a multiphase generator conversion system according to previous aspects herein. Each wind turbine may generate an n-phase MF/HF AC voltage at an output. The wind turbine cluster may further include a second rectification module, such as a diode rectifier, arranged to receive the plurality of n-phase AC voltages at an input and generate a DC voltage at an output. The wind turbine cluster may be an offshore wind turbine cluster. Thus, any reduction in the number of components may minimize installation and maintenance requirements and, thus, further reduce the cost of a wind turbine power plant.

In some embodiments the second rectification module may be arranged with one of the plurality of wind turbines. This may allow easy integration in a platform of the wind turbine. This is particularly beneficial in offshore wind turbine clusters where any equipment may be strategically arranged inside the towers of the wind turbine to be protected from weather.

BRIEF DESCRIPTION OF THE DRAWINGS

Particular embodiments of the present invention will be described in the following by way of non-limiting examples, with reference to the appended drawings, in which.

DETAILED DESCRIPTION OF THE INVENTION

Figure 1:
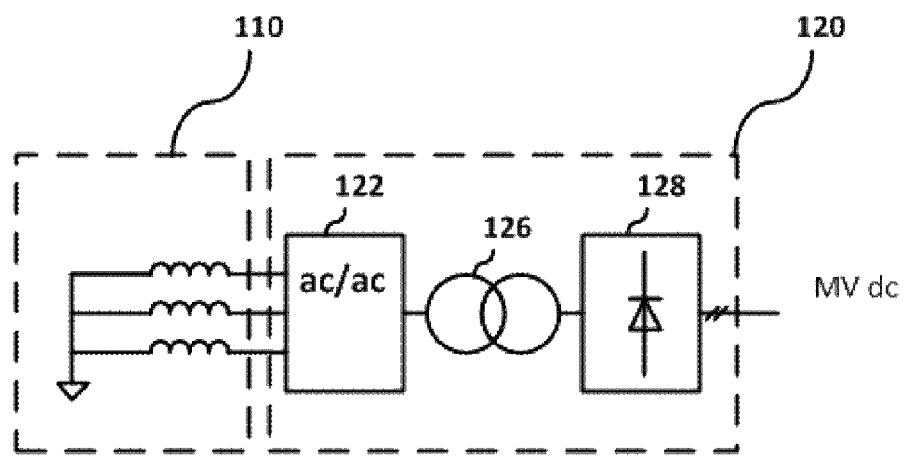
FIG. 1 illustrates a prior art generation-conversion system.

FIG. 1 shows a prior art DC generation-conversion system. Generation-conversion system 100 includes one 3-phase AC generator 110 and a conversion line 120 having an AC/AC matrix converter 122, a Low Voltage/Medium Voltage (LV/MV), Medium Frequency/High Frequency (MF/HF) transformer 126, and a diode rectifier 128. Alternatively, instead of an AC/AC matrix converter the conversion line could have a rectifier in series with a DC/AC inverter.

Figure 2A:
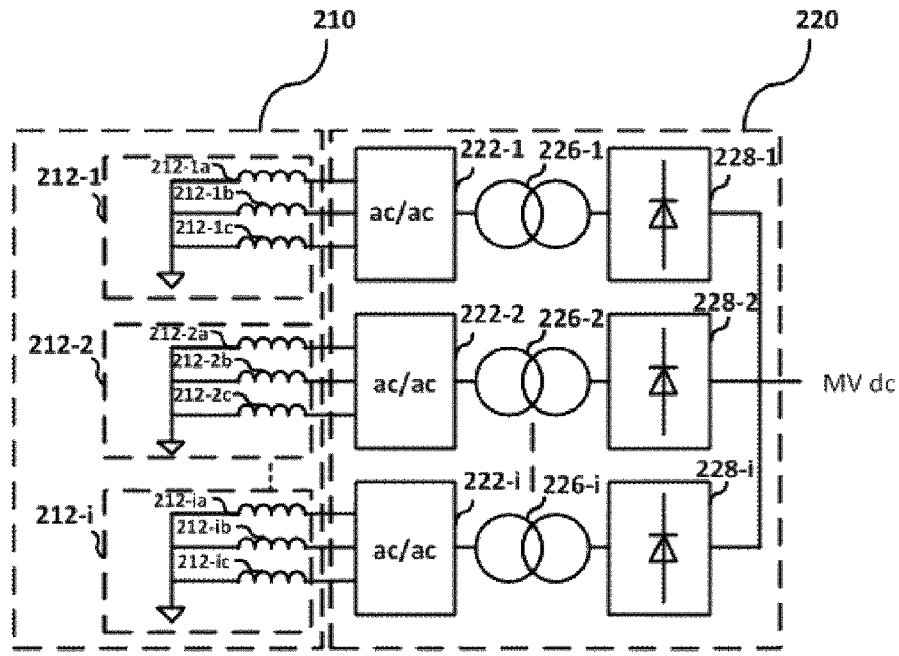
FIGS. 2A and 2B illustrate multiphase generation-conversion systems with diode-based rectifiers in both machine and grid side converters.

FIG. 2A shows a multiphase generation-conversion system. Generation-conversion system 200 includes a multiphase generator 210 and a conversion system 220. Multiphase generator 210 has i number of multiphase stators (212-1, 212-2 . . . 212-$i$). Each multiphase stator includes 3 phase legs [(212-1 $a$, 212-1 $b$, 212-1 $c$), (212-2$a$, 212-2$b$, 212-2$c$), (212-$ia$, 212-$ib$, 212-$ic$)]. Each phase leg may correspond to a winding of the multiphase stator and carry a single distinct phase of the multiphase stator. The phase legs of each stator are coupled to a rectification module of a conversion line of the conversion system 220. Each conversion line includes an ac/ac converter, an LV/MV transformer and a rectifier. The three phase legs of the first stator 212-1 are connected to ac/ac converter 222-1 of the conversion system 220. Accordingly, the three phase legs of the other stators (212-2 to 212-($i$)), are coupled to ac/ac converters 222-2 to 222-($i$). Each of the ac/ac converters 222-1 to 222-$i$ is coupled to a LV/MV transformer 226-1 to 226-$i$, respectively. Finally, each of the LV/MV transformers 226-1 to 226-$i$ is coupled to a diode rectifier 228-1 to 228-$i$, respectively. The DC outputs of the rectifiers 228-1 to 228-$i$ may be coupled to the grid.

It can be seen that such a configuration implies a number of LV/MV transformers and a number of rectifiers that corresponds to the number of stators. Therefore, the more stators the generator 210 has the more transformers and rectifiers are needed.

Figure 2B:
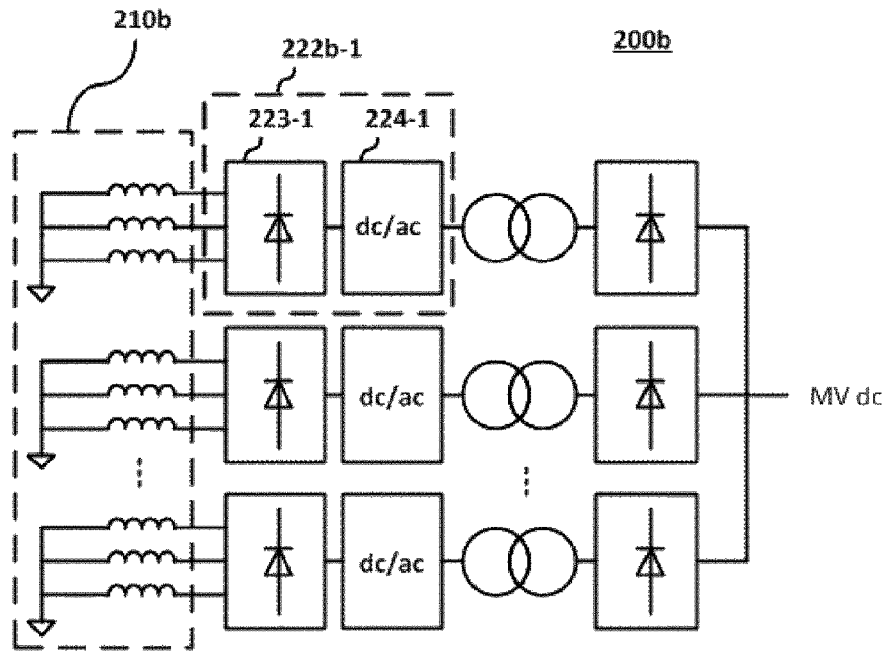

FIG. 2B shows another multiphase generation-conversion system. Multiphase generation-conversion system has generator 210$b$ that is similar to generator 210. However, instead of an ac/ac converter, the conversion lines of generator conversion system 200 has a rectifier in series with a dc/ac inverter. For example, ac/ac module 222$b$-1 has rectifier 223-1 in series with dc/ac inverter 224-1.

Figure 3:
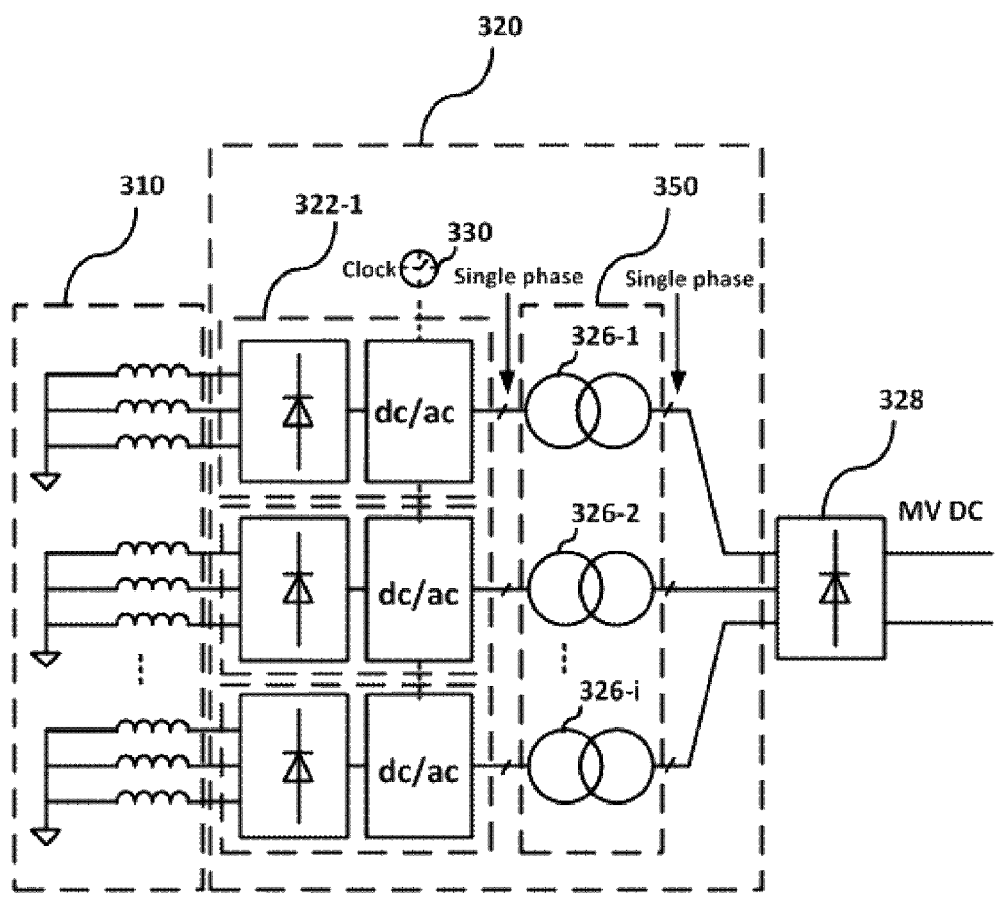
FIG. 3 illustrates a generation-conversion system with diode rectifiers according to an example.

FIG. 3 shows a generation-conversion system according to an example. Generation-conversion system 300 includes a multiphase generator 310 and a conversion system 320. Multiphase generator 310 is similar to multiphase generator 210 described with reference to FIG. 2. Accordingly, the phase legs of each stator of multiphase generator 310 are coupled to an ac/ac module, such as ac/ac module 322-1, of a conversion line of the conversion system 350. Each conversion line includes an ac/ac module and an LV/MV and MF/HF transformer. The ac/ac module may be a rectification module in series with a dc/ac inverter. However, the LV/MV and MF/HF transformers.

326-1 to 326-$i$ are single phase transformers. The LV/MV and MF/HF transformers 326-1 to 326-$i$ may belong to a transformer module 350. Furthermore, ac/ac modules, e.g. the dc/ac inverters, are controlled so that the outputs carry distinct phases that do not coincide with each other. Therefore the single phase outputs of the LV/MV and MF/HF transformers shall also be out of phase. As a result, the single phase outputs of the LV/MV and MF/HF transformers may be introduced in one rectifier. For example, in case the generator has three 3-phase stators, there will be 3 single phases that shall be introduced to the input of the rectifier. Therefore, this configuration allows a reduction in the number of rectifiers when compared with the configuration discussed with reference to FIG. 2A. The dc/ac inverters may be controlled with the help of a clock 330, common to all inverters, so that each dc/ac inverter is out of phase from the rest of the dc/ac inverters. In the example of three 3-phase stators, the phases may be 120 degrees apart, thus corresponding to a conventional three-phase system at the output of the ac/ac module.

Figure 4:
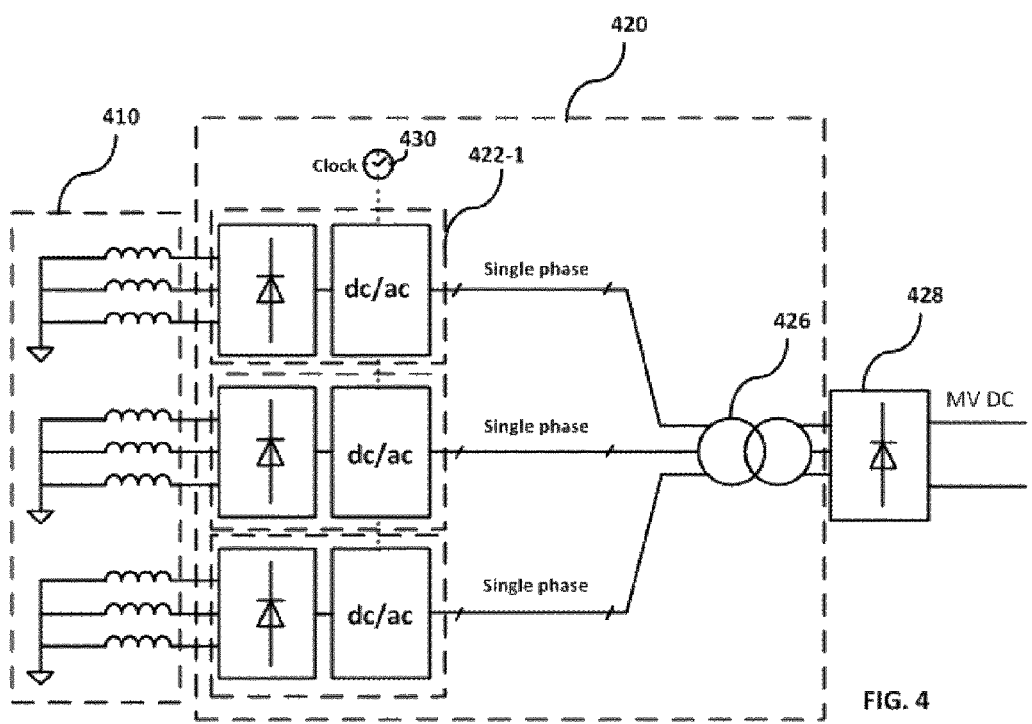
FIG. 4 illustrates a generation-conversion system according to another example with both rectifier stages based on unidirectional converters.

FIG. 4 shows a generation-conversion system according to another example. Generation-conversion system 400 includes a multiphase generator 410 and a conversion system 450. Multiphase generator 410 is similar to multiphase generators 210 and 310 described with reference to FIGS. 2A and 3. Accordingly, the phase legs of each stator of multiphase generator 410 are coupled to an ac/ac module, e.g. ac/ac module 422-1, of a conversion line of the conversion system 450. Each conversion line includes only an ac/ac module, whereas each ac/ac module may include a rectification module and a dc/ac inverter. However, there is only one LV/MV and MF/HF multiphase transformer 426 for receiving the plurality of the single phase signals that are output from the ac/ac modules, e.g. from the dc/ac inverters of the ac/ac modules. Instead of having one LV/MV and MF/HF transformer for each conversion line, as in the example of FIG. 3, the implementation according to FIG. 4 foresees only one LV/MV and MF/HF multiphase transformer 426. To achieve this, the ac/ac modules, e.g. the dc/ac inverters of the ac/ac modules, are similarly controlled by a clock 430 so that their output carry distinct phases that do not coincide with each other. The multiphase output of the LV/MV and MF/HF multiphase transformer 426 may be introduced in one rectifier 428. For example, in case the generator has three 3-phase stators, the LV/MV and MF/HF transformer 426 shall be a 3-phase transformer and, accordingly, there will be a 3-phase signal that shall be introduced at the input of the rectifier 428. Therefore, this configuration allows a reduction not only in the number of rectifiers, when compared with the configuration discussed with reference to FIG. 2A, but also in the number of LV/MV and MF/HF transformers.

Figure 5:
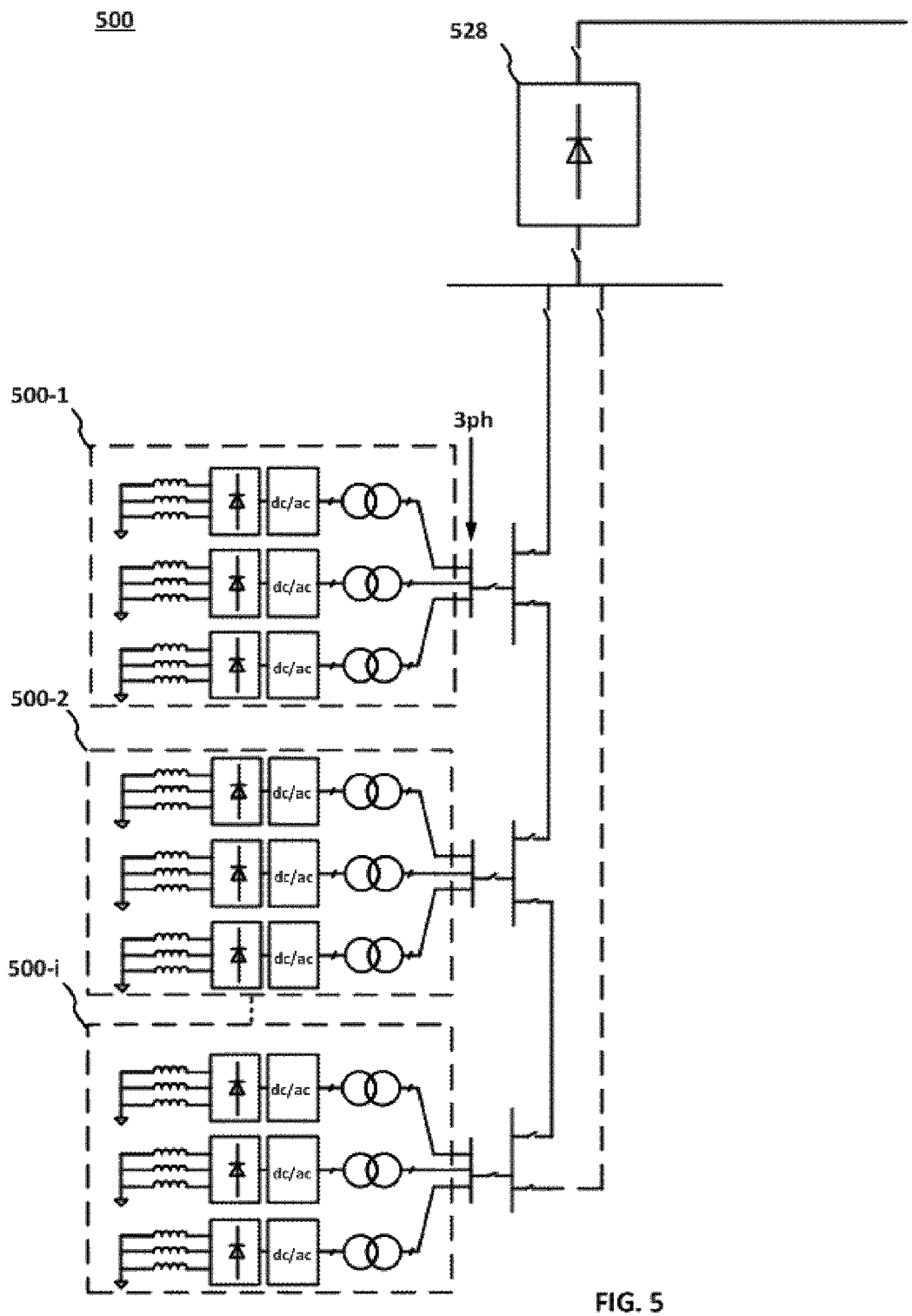
FIG. 5 illustrates an example of a multiphase generation-conversion cluster.

FIG. 5 shows an example of a multiphase generation-conversion cluster. Cluster 500 has a plurality of generation conversion systems 500-1 to 500-$i$. Each generation conversion system may be similar to the generation conversion system described with reference to FIG. 3. The generation conversion systems illustrated in FIG. 5 are 9-phase, 3-stator systems. However, one skilled in the art may appreciate that any multiphase generation conversion system may be used as part of an embodiment of the present invention. In the generation conversion cluster illustrated in FIG. 5 there is only one rectifier 528 coupled at the 3-phase output of the generation conversion systems 500-1 to 500-$i$. Therefore there is a further reduction in the number of rectifier components, this time at a cluster level. The generation conversion systems may be coupled to the rectifier in a star configuration, as shown in FIG. 5. The rectifier shall, thus, receive a 3-phase signal.

Figure 6:
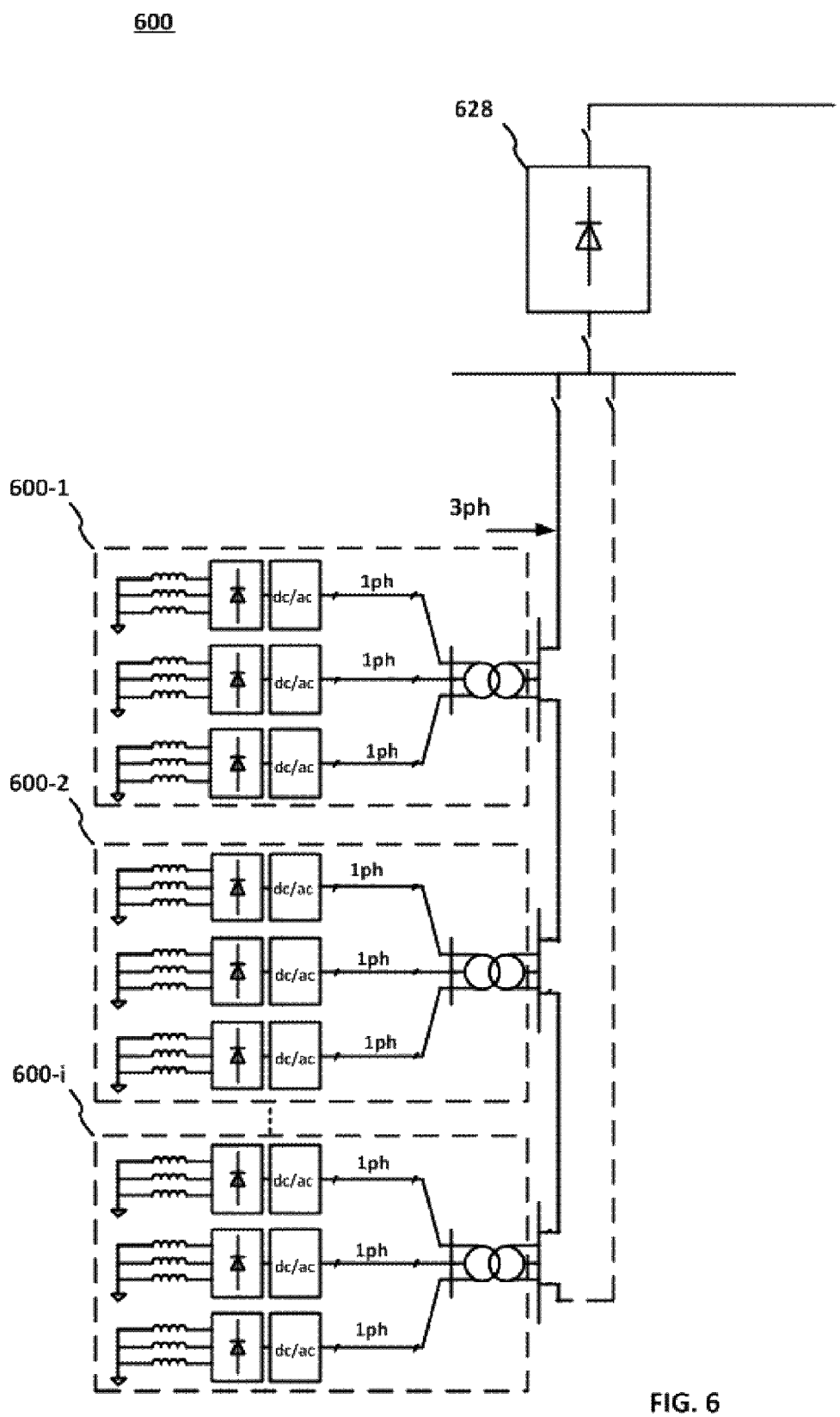
FIG. 6 illustrates another example of a multiphase generation-conversion cluster, having diode-based rectification stages.

FIG. 6 shows another example of a multiphase generation-conversion cluster. Cluster 600 has a plurality of generation conversion systems 600-1 to 600-$i$. Each generation conversion system is similar to the generation conversion system described with reference to FIG. 4. Similarly, the generation conversion systems illustrated in FIG. 6 are 9-phase, 3-stator systems. However, one skilled in the art may also appreciate that any multiphase generation conversion system may be used as part of an embodiment of the present invention. Again, there is only one rectifier coupled to the output of the generation conversion systems. Therefore again there is a further reduction in the number of rectifier components on a cluster level. The generation conversion systems may be, similarly to the configuration described with reference to FIG. 5, coupled to the rectifier in a star configuration. The rectifier shall, accordingly, receive a 3-phase signal.

In other configurations a multiphase generation-conversion cluster may have a mixture of generation-conversion systems according to FIG. 3 and FIG. 4. This may be the case if, for example, some generation-conversion systems are already installed and other ones are being replaced or added to the cluster. Furthermore, the rectifiers 528 or 628 may be arranged with one of the generation conversion systems of the cluster. For example, it may be arranged with the generation conversion system that is physically closer to the rest of the systems.

Although diode rectifiers are used in the examples of FIG. 3 to FIG. 6 one skilled in the art may appreciate that the generation-conversion systems and clusters may be coupled to any other type of rectification modules that is known in the art that may be suitable for coupling to a DC grid.

Although only a number of particular embodiments and examples of the present invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

What is claimed is:

1. A multiphase generator-conversion system comprising:
a multiphase generator;
n conversion lines; and
a transformer module, wherein:
the multiphase generator has one rotor and n number of multiphase stators, each multiphase stator comprising a plurality of phase lines;
each of the n conversion lines is coupled to the plurality of phase lines of one of the n multiphase stators, respectively, each conversion line comprising:
an ac/ac module, coupled to the respective plurality of phase lines, configured to receive a multi-phase AC voltage and generate a single phase AC voltage at an output; and
the transformer module is configured to receive the n single-phases of the ac/ac modules and generate an n-phase AC voltage at an output.

2. A multiphase generator conversion system according to claim 1, wherein the transformer module comprises n single-phase transformers, each coupled to one of the n outputs of the ac/ac modules, wherein the n output voltages of the n single phase transformers comprise the n-phase AC voltage.

3. A multiphase generator conversion system according to claim 1, wherein the transformer module comprises a single n-phase transformer, configured to receive the n outputs of the ac/ac modules at n inputs, respectively, and generate the n-phase AC voltage at an output.

4. A multiphase generator conversion system according to claim 1, wherein n is equal to 3.

5. A multiphase generator conversion system according to claim 1, wherein the transformer module comprises low voltage/medium voltage, medium frequency/high frequency transformers.

6. A multiphase generator conversion system according to claim 1, wherein the ac/ac module comprises an ac/ac matrix converter.

7. A multiphase generator conversion system according to claim 1, wherein the ac/ac module comprises:
   a first rectification module, coupled to the respective plurality of phase lines, configured to receive the multiphase AC voltage and generate a first DC voltage at an output of the first rectification module, and
   a dc/ac inverter coupled to the output of the respective first rectification module, the dc/ac inverter receiving the first dc voltage and generating the single phase AC voltage at an output.

8. A multiphase generator conversion system according to claim 7, further comprising a second rectification module, configured to receive the n-phase AC voltage at an input and generate a second DC voltage at an output of the second rectification module.

9. A multiphase generator conversion system according to claim 8, wherein at least one of the rectification modules is a diode rectifier.

10. A wind turbine comprising a multiphase generator conversion system according to claim 1.

11. A multiphase generator conversion cluster comprising:
   one or more multiphase generator conversion systems according to claim 7, each generating an n-phase AC voltage at an output, and
   a second rectification module, configured to receive the one or more n-phase AC voltages at an input and generate a second DC voltage at an output of the second rectification module.

12. A multiphase generator conversion cluster according to claim 11, wherein the second rectification module is a diode rectifier.

13. A wind turbine cluster, comprising:
   a plurality of wind turbines, each wind turbine comprising a multiphase generator conversion system according to claim 7, each generating an n-phase AC voltage at an output; and
   a second rectification module, configured to receive the plurality of n-phase AC voltages at an input and generate a second DC voltage at an output of the second rectification module.

14. A wind turbine cluster according to claim 13, wherein the second rectification module is arranged with one of the plurality of wind turbines.

15. A wind turbine cluster according to claim 13, wherein the second rectification module is a diode rectifier.

16. A wind turbine cluster according to claim 14, wherein the second rectification module is a diode rectifier.

17. A wind turbine comprising:
a multiphase generator configured to be driven by wind;
plural conversion lines; and
a transformer module, wherein:
   the multiphase generator has one rotor and plural multiphase stators, wherein the number of multiphase stators is equal to the number of conversion lines, and each multiphase stator comprising a plurality of phase lines;
   each of the conversion lines is coupled to the plurality of phase lines of one of the multiphase stators, respectively, each conversion line comprising:
      an ac/ac module, coupled to the respective plurality of phase lines, configured to receive a first multiphase AC voltage and generate a single phase AC voltage at an output; and
   the transformer module is configured to receive the single-phases of the ac/ac modules and generate a second multi-phase AC voltage at an output, wherein the number of phases of the second multi-phase AC voltage is equal to the number of multiphase stators and the number of conversion lines.

* * * * *